L. C. HILL.
LAMP.
APPLICATION FILED OCT. 17, 1918.
1,434,341. Patented Oct. 31, 1922.
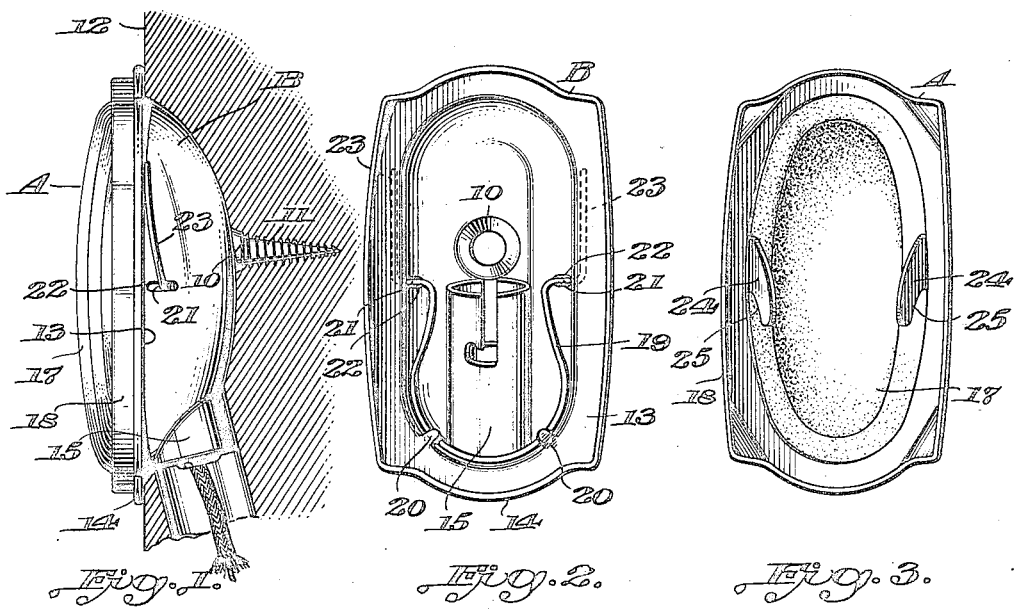
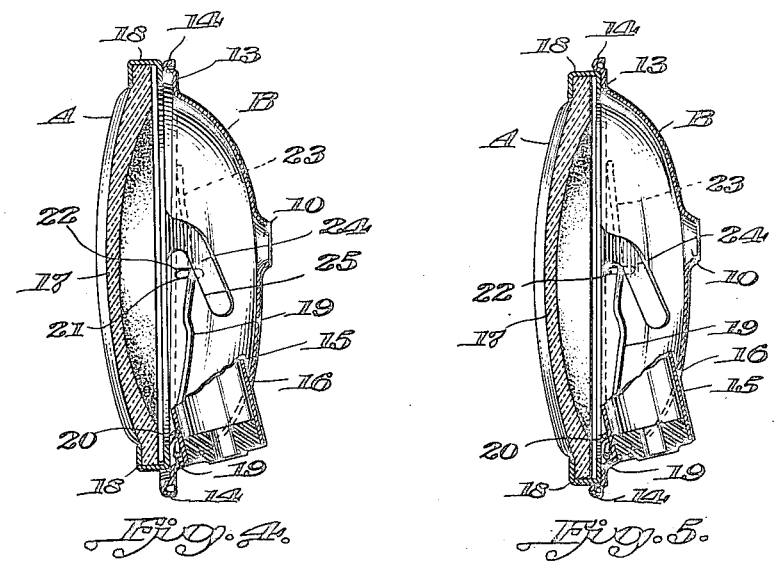
Inventor,
Lewis C. Hill,
By Foster, Freeman, Watson & Coit,
Attys.

Patented Oct. 31, 1922.

1,434,341

UNITED STATES PATENT OFFICE.

LEWIS CLAYTON HILL, OF DETROIT, MICHIGAN, ASSIGNOR TO PACKARD MOTOR CAR COMPANY, OF DETROIT, MICHIGAN, A CORPORATION OF MICHIGAN.

LAMP.

Application filed October 17, 1918. Serial No. 258,514.

*To all whom it may concern:*

Be it known that I, LEWIS C. HILL, a citizen of the United States, and residing at Detroit, Wayne County, State of Michigan, have invented certain new and useful Improvements in Lamps, of which the following is a specification.

This invention relates to a lamp and more particularly to a lamp designed for use in the interior of a closed motor vehicle.

The principal object of the invention is to provide an easily manipulated means to secure the lens member of the lamp to the reflector member in a manner which positively fastens the members together and yet permits their separation merely by moving one member relative to the other, there being no devices to depress or manipulate during this latter operation. Other objects and features of novelty will be apparent from the description taken in connection with the drawings, in which:—

Figure 1 is a side elevation of a lamp constructed in accordance with the present invention, illustrating the manner in which the reflector member is set into its supporting member with the lens member substantially flush with the front surface of said supporting member;

Figure 2 is a front elevation of the reflector member, the lens member having been removed;

Figure 3 is a rear elevation of the lens member;

Figure 4 is a sectional elevation through the two members of the lamp illustrating them in the positions which they occupy prior to the final movement in putting the two members together; and Figure 5 is a sectional elevation similar to Figure 4 showing the lens member secured in operative position to the reflector member.

Referring to the drawings, the lamp illustrated comprises a lens member A removably secured to a reflector member B. This latter member is hollow or dish-shaped, at the bottom thereof being formed with a screw aperture 10 through which a screw 11 may be inserted for the purpose of holding the reflector member securely in the recess formed therefor in the supporting member 12. The reflector member is formed with a rim 13, the peripheral edge of which is provided with a bead or flange 14, the rim and flange together forming a rabbeted seat for the lens member. A socket or post 15 for an electric bulb extends through an aperture 16 formed in the reflector member and is secured therein in any desired manner.

The lens member A comprises a lens 17, the edges of which may be protected by a rim 18 of channel shape in cross section. This rim is adapted to fit the seat 13 with its peripheral edge engaging or surrounded by the bead or flange 14.

The means for detachably securing these two members together comprises a tongue or prong on one member adapted to engage a yieldable or spring member on the other member and stress the spring so that the two members are yieldingly held together. As shown the reflector member is provided with a spring which has a U-shaped portion 19 the bottom of which is disposed in front of the post or socket 15, tabs 20 being provided to properly secure the spring in this position. The upper ends of the arms of the U-shaped portion of the spring are bent out to provide the oppositely extending horizontal portions 21 which extend through slots 22 formed in the reflector member. The portions of the spring on the exterior of the reflector member are bent at right angles to the offsets 21, and the upper ends bear against the rear side of the rim 13. As clearly shown in Figures 4 and 5 each half of the spring has its upper end bearing against the rim 13 and its lower portion disposed in front of the post 15 and secured in this position and between these two ends the spring is slightly bent toward the bottom of the reflector member so that if the offsets 21 are forced toward the front of the lamp the spring will be stressed.

On the rear of the lens member are provided a pair of oppositely disposed prongs or tongues 24 which extend rearwardly and downwardly and are inclined slightly toward each other. As clearly shown in Figures 4 and 5, the lower or interior edge 25 of each prong is inclined with respect to the lens member forming an acute angle therewith, this edge being disposed so that it engages over the offsets 21 on the spring and causes the spring to be stressed when the two members of the lamp are assembled.

In the operation of putting the two parts of the lamp together the lens member A is held in front of the reflector member and slightly offset upward relative to its seat 13, the prongs 24 thus being positioned so that when the lens member is moved downwardly the prongs engage the offsets 21 of the spring and stress the same. This downward movement of the lens member brings the parts to the positions shown in Figure 4. Then a slightly further downward movement of the lens member causes the rim 18 to be snapped to its seat on the reflector member because of the spring or yielding member 19. It will be seen, therefore, that the prongs and spring cooperate to hold the lens member against the reflector member while the flange 14 co-operates with the lens member to prevent transverse movement of one with respect to the other. In order to disconnect the two parts of the lamp it is merely necessary to simultaneously exert a slight upward pressure at the bottom of the lens member and a slight outward force at the top thereof, that is, a force tending to move the upper end of the lens member toward the left as viewed in Figure 5. The outward force at the upper part of the lens member will move this upper part from the seat 13 enough so that the upward force exerted at the bottom of the lens member may carry the entire lens member transversely with respect to the reflector member and thus disengage the prongs 34 from the spring.

Although a specific embodiment of the invention has been described in detail it is to be understood that the invention is not limited to the exact constructon shown but includes modifications and changes which come within the scope of the appended claims.

Having thus described the invention what is claimed as new and desired to be secured by Letters Patent is:—

1. A lamp for motor vehicles comprising in combination, a lens member, a dish-shaped reflector member having a flat rim provided with a marginal flange, the lens member adapted to seat on said flat rim with the flange surounding its marginal edges to limit relative transverse movement of said members, and means to removably secure the members together including a pair of yieldable elements on one member located on opposite sides of the optical axis of the lamp and a pair of prongs on the other member constructed and arranged to engage over the elements, said prongs projecting toward the same side portion of the lamp.

2. A lamp for motor vehicles comprising in combination, a lens member, a reflector member, and means to removably secure the members together including a yieldable element on one member and a prong on the other having its interior edge at an acute angle thereto adapted to be passed over said element, and place it under tension, by transverse rectilinear movement of one member relative to the other, and a flange on one member surrounding the other to prevent relative transverse movement of said members after they have been assembled.

3. A lamp for motor vehicles comprising in combination, a lens member, a reflector member, and interlocking means on said members to removably secure them together by a relative transverse rectilinear movement of said members, including a pair of like prongs on one member disposed symmetrically on opposite sides of the optical axis of the lamp.

4. A lamp for motor vehicles comprising in combination, a lens member, a reflector member, one of said members having a marginal flat seat in a plane perpendicular to the optical axis of the lens, said seat bounded by an axially extending flange, and means to yieldably and removably secure the other member against said seat.

5. A lamp for motor vehicles comprising in combination, a lens member, a concave reflector member having an annular rabetted seat, the lens member adapted to rest against said seat, and means disposed inside the area bounded by the inner edge of said seat to hold the members together.

6. A lamp for motor vehicles comprising in combination, a lens member, a reflector member, one of said members having a rabbeted seat for the other member, a prong on the lens member having an interior edge forming an acute angle with the adjacent surface of the lens member and a yieldable element within the reflector member adapted to be engaged by said interior surface of said prong.

7. A lamp for motor vehicles comprising in combination, a lens member, a reflector member, a yieldable element on one member comprising a spring wire having a part on the outside and a part on the inside thereof, said parts connected by an offset extending through a slot in said member, a prong on the other member adapted to be passed over said offset to stress said element, and means to hold said members against relative transverse movement.

8. A lamp for motor vehicles comprising in combination, a lens member, a concave reflector member having an annular rabetted seat, the lens member adapted to rest against said seat, and means disposed inside the confines of the inner edge of said seat to hold the members together including a yieldable element on one member and a prong on the other adapted to engage over said element.

9. A lamp for motor vehicles comprising in combination, a lens member, a hollow reflector member, and means to secure said members together including a spring within the hollow of said reflector member and a prong on the other member removably engaging and tensioning said spring.

10. A lamp for motor vehicles comprising in combination, a lens member having a rearwardly and downwardly inclined prong, a hollow reflector member having a spring wire engaged and stressed by the interior edge of said prong, when one member has a transverse rectilinear movement with respect to the other.

11. A lamp for motor vehicles comprising in combination a lens member, a concave reflector member having an annular rabetted seat, the lens member adapted to rest against said seat, said reflector member having a spring element comprising a U-shaped part within the reflector having offsets at its ends extending through slots in the reflector and having extensions on the outside of the reflector the ends of which bear on the reflector, and prongs on the lens member adapted to engage over said offsets.

12. A lamp for motor vehicles including in combination, a lens member, a reflector member having a rabetted seat adapted to receive the lens member, one of said members having a pair of prong elements symmetrically located on opposite sides of the optical axis of the lamp, a pair of locking elements on the other member adapted to cooperate with the interior edges of said prongs to hold the members together, and one pair of elements being yieldably mounted.

13. A lamp for motor vehicles comprising in combination, a lens member, a reflector member, one of said members having a flat seat in a plane perpendicular to the optical axis of the lens, said seat bounded by an axially extending flange, and interlocking means on said members to secure the other of said members against said seat, said means being interlocked by relative rectilinear transverse movement of said members.

In testimony whereof I affix my signature.

LEWIS CLAYTON HILL.